Patented Oct. 26, 1937

2,097,112

UNITED STATES PATENT OFFICE 2,097,112

ANTHRAQUINONE-BENZACRIDONE VAT DYESTUFFS

Wilhelm Bauer, Leverkusen-Wiesdorf, and Hans Hoyer and Bernhard Bollweg, Leverkusen-I. G. Werk, Germany, assignors to General Aniline Works, Inc., New York, N. Y., a corporation of Delaware No Drawing. Application May 19, 1936, Serial No. 80,634. In Germany May 23, 1935

4 Claims. (Cl. 260—37)

The present invention relates to new vat dyestuffs of the anthraquinone series.

The anthraquinone-2.1(N)-benzacridones are vat dyestuffs which are distinguished by an excellent fastness to light and yield red to bluish-red shades. However, most of these compounds cannot be employed for practical purposes owing to their insufficient fastness to boiling. It is known that the fastness to boiling of these products can be improved to a certain extent by the introduction of halogen substituents; however, no clear success has been reached up to the present time.

It is the object of our present invention to prepare anthraquinone-benzacridones which as to fastness properties meet every practical demand. Another object of our invention resides in the development of a process by which anthraquinone-benzacridones of the required fastness properties can be prepared. With these and other objects in view our invention primarily consists in the preparation of new vat dyestuffs which are defined as "anthraquinone-2.1.(N)-1'.2'-(N)-benzacridones which contain an aryloxy group in 3'-position". These compounds combine a good fastness to light with an excellent fastness to boiling. They yield clear violet to red shades. The presence of indifferent substituents in the benzacridone as well as in the aryloxy group is not precluded, halogen atoms or alkoxy groups being preferred substituents.

For the preparation of our new vat dyestuffs we start from 2'-aryloxy-1-phenylaminoanthraquinone-2-carboxylic acids or the functional derivatives thereof. These compounds may contain indifferent substitutents provided that the Bz-6'-position is unsubstituted. Upon the action of ring closing agents such as benzoyl chloride, aluminium chloride or ferric chloride the desired vat dyestuffs are obtained in a good yield. The 2'-aryloxy-1-phenylaminoanthraquinone-2-carboxylic acids may easily be obtained by causing ortho-aminodiaryl ethers to react upon 1-chloro or 1-nitroanthraquinone-2-carboxylic acids. As examples for functional derivatives of the carbocylic acids described there many be mentioned their esters, chlorides or nitriles. The formation of the new dyestuffs probably corresponds to the following equation:

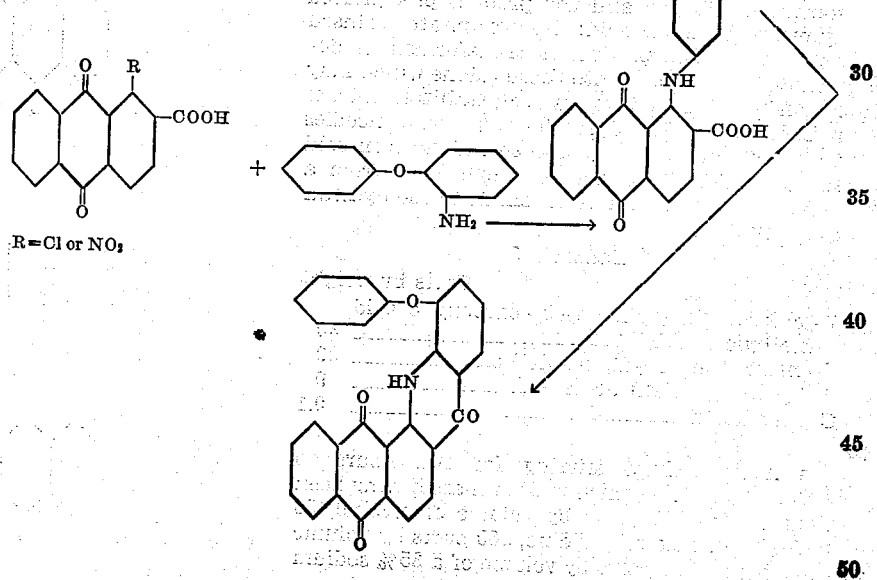

R = Cl or NO₂

The following examples illustrate the invention without, however, restricting it thereto.

*Example 1*

| | Parts by weight |
|---|---|
| 1-chloroanthraquinone-2-carboxylic acid methylester | 30 |
| Ortho-aminodiphenylether | 30 |
| Anhydrous sodium acetate | 9 |
| Copper acetate | 0.1 | are heated whilst stirring for 2 hours to 170° C. The reaction product is saponified by heating for 1 hour with 200 parts by volume of alcohol, 200 parts by volume of water, 50 parts by volume of pyridine and 35 parts by volume of a 33% sodium hydroxide lye. Thereupon the solution is filtered and the 2'-phenoxy-1-phenylaminoanthraquinone-2-carboxylic acid which is of violet coloration is precipitated. The product is filtered with suction, rinsed and dried; by heating it for 1 hour and a half to 150° C. with 40 parts by weight of benzoyl chloride and 200 parts by volume of orthodichlorobenzene the acridone is formed which already separates while hot in a crystalline form. After cooling, the precipitate is filtered with suction, rinsed and dried. The dyestuff forms violet-black needles which dissolve with a yellow-red color in cold concentrated sulfuric acid. On dilution with water this solution precipitates in violet flakes. The dyestuff may be recrystallized from hot nitrobenzene. From a violet vat the dyestuff dyes vegetable fibres in fast violet shades and is suitable for the sodium formaldehyde sulfoxylate printing process. Furthermore, it may be transformed in the usual manner into its leuco sulfuric acid esters which yield in the dyeing and printing process violet shades of good fastness.

*Example 2*

| | Parts by weight |
|---|---|
| 1-nitroanthraquinone-2-carboxylic acid | 29.7 |
| Ortho-aminophenylether | 37 |
| Orthodichlorobenzene | 200 | are heated for 2 hours to 175° C., water formed during the reaction being distilled off. On the addition of 30 parts by volume of a 33% sodium hydroxide lye and some water the orthodichlorobenzene is blown off with steam. Thereupon the solution is filtered and the product precipitated by means of acetic acid; the precipitate is rinsed and dried. The product is transformed as described in Example 1 into the acridone which may be purified, if necessary, by recrystallization from nitrobenzene. The dyestuff forms violet needles which dissolve with a yellowish-red color in cold sulfuric acid. They dye vegetable fibres from a violet vat in a similar violet shade to the dyestuff of Example 1.

*Example 3*

| | Parts by weight |
|---|---|
| 1-chloroanthraquinone-2-carboxylic acid methylester | 30 |
| 5-chloro-2-amino-diphenylether | 30 |
| Anhydrous sodium acetate | 9 |
| Copper acetate | 0.1 | are heated whilst stirring for two hours to 160–170° C. The warm molten mass having been diluted with 200 parts by volume of alcohol, 50 parts by volume of pyridine, 200 parts by volume of water and 35 parts by volume of a 35% sodium hydroxide lye is heated on the water bath in order to saponify the methyl ester. Thereupon the melt is diluted with water, filtered and after acidifying the filtrate, the product precipitated is filtered with suction and the residue rinsed till the reaction is neutral and dried. In order to form the acridone ring the reaction product is dissolved in 200 parts by volume of orthodichlorobenzene and heated with 40 parts by volume of benzoyl chloride to 150° C., the acridone already crystallizing out to some extent at elevated temperatures. The dyestuff forms brown-red needles, which dissolve with a crimson red color in sulfuric acid. From a violet vat the acridone yields bluish violet shades of good fastness properties.

*Example 4*

| | Parts by weight |
|---|---|
| 1-chloroanthraquinone-2-carboxylic acid | 30 |
| 4.6-dichloro-2-aminodiphenylether | 30 |
| Anhydrous sodium acetate | 9 |
| Copper acetate | 0.1 | are condensed in the manner described in the preceding example. The anthraquinone-2.1-(N)-1'.2'(N)-4'-6'-dichloro-3'-phenoxybenzene acridone is thus obtained. The dyestuff forms red leaflets, which dissolve in sulfuric acid with a golden-yellow color. The acridone yields from a violet vat clear bluish pink shades of excellent fastness.

*Example 5*

In this example we confine ourselves to the drawing of the formulae of several further dyestuffs of the character described. All these products can be prepared in a manner quite analogous to that described in the foregoing examples. The right hand column shows the shades of the dyestuffs in question:

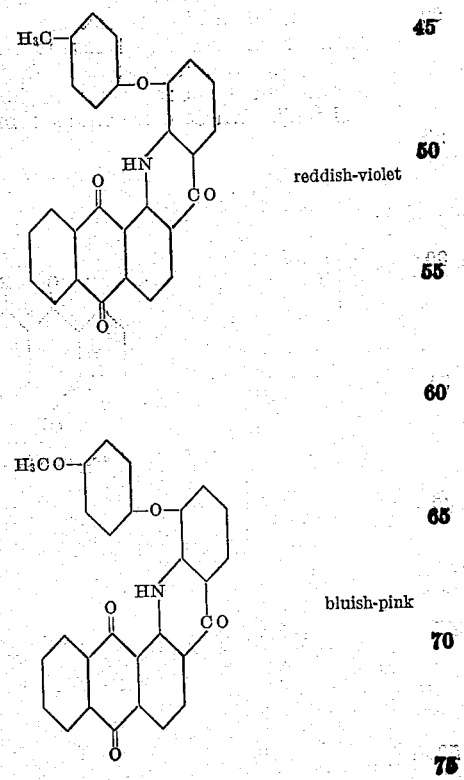

reddish-violet bluish-pink

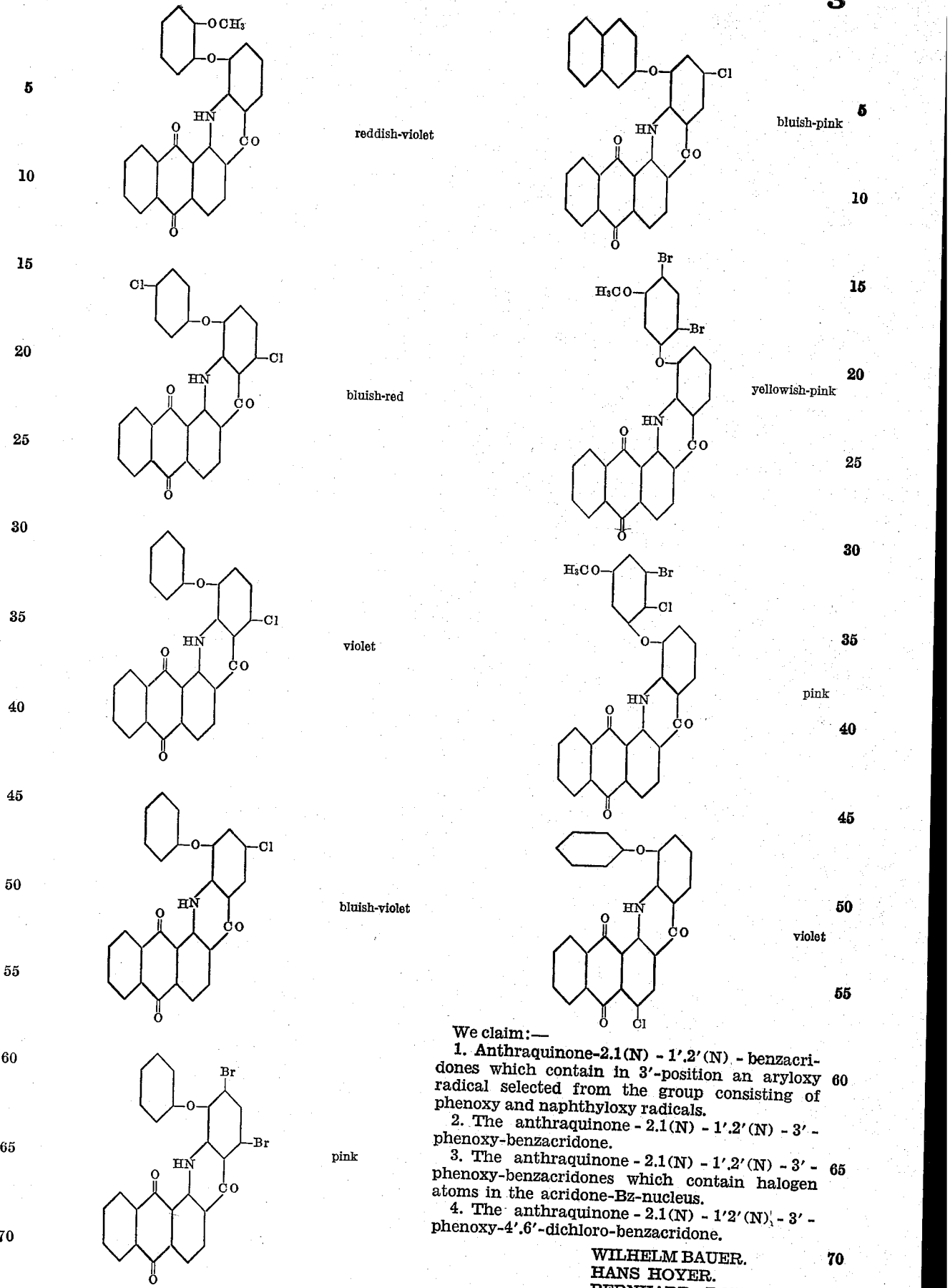

We claim:—
1. Anthraquinone-2.1(N) - 1'.2'(N) - benzacridones which contain in 3'-position an aryloxy radical selected from the group consisting of phenoxy and naphthyloxy radicals.
2. The anthraquinone - 2.1(N) - 1'.2'(N) - 3' - phenoxy-benzacridone.
3. The anthraquinone - 2.1(N) - 1'.2'(N) - 3' - phenoxy-benzacridones which contain halogen atoms in the acridone-Bz-nucleus.
4. The anthraquinone - 2.1(N) - 1'2'(N) - 3' - phenoxy-4'.6'-dichloro-benzacridone.

WILHELM BAUER.
HANS HOYER.
BERNHARD BOLLWEG.